United States Patent [19]

Dent

[11] 4,217,827
[45] Aug. 19, 1980

[54] RADAR FUZING SYSTEM

[75] Inventor: John R. Dent, Fairfax County, Va.

[73] Assignee: The United States of America as represented by the Secretary of the Army, Washington, D.C.

[21] Appl. No.: 331,160

[22] Filed: Feb. 8, 1973

Related U.S. Application Data

[63] Continuation-in-part of Ser. No. 43,300, Apr. 23, 1970, abandoned.

[51] Int. Cl.³ .............................................. F42C 13/04
[52] U.S. Cl. ..................................... 102/214; 102/215
[58] Field of Search ......,..................... 102/70.2, 70.2 P; 244/3.14

[56] References Cited

U.S. PATENT DOCUMENTS 3,714,898   2/1973   Ziemba .................................. 244/3.14

Primary Examiner—Charles T. Jordan
Attorney, Agent, or Firm—Nathan Edelberg; Robert P. Gibson; Saul Elbaum

[57] ABSTRACT

A frequency modulated continuous wave radar signal is transmitted to a target and the signal reflected from the target is compared with a sample of the continuous wave transmitter to produce a difference frequency signal. The difference frequency signal is band-pass amplified, wide-band limited, and processed by two frequency discriminators displaced from each other in the frequency domain, but both within the frequency band of the limiter and band pass amplifier. Detectors, integrators, and thresholding circuits determine, with suitable false alarm rates, in which half of which discriminator the difference frequency signal is concentrated.

3 Claims, 8 Drawing Figures fd = DIFFERENCE FREQUENCY
τ = ROUND TRIP DELAY TIME
fm = MODULATION FREQUENCY
Δf = PEAK TO PEAK TRANSMITTER FREQUENCY DEVIATION

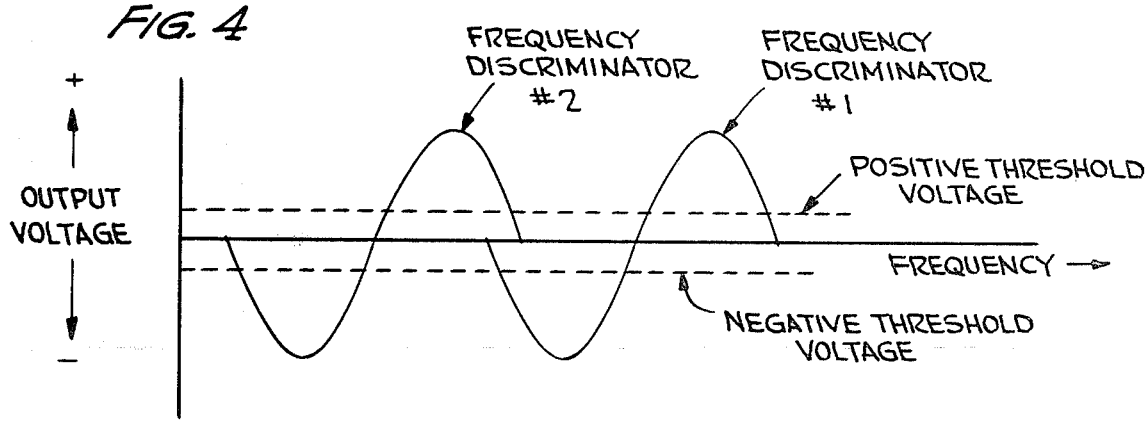
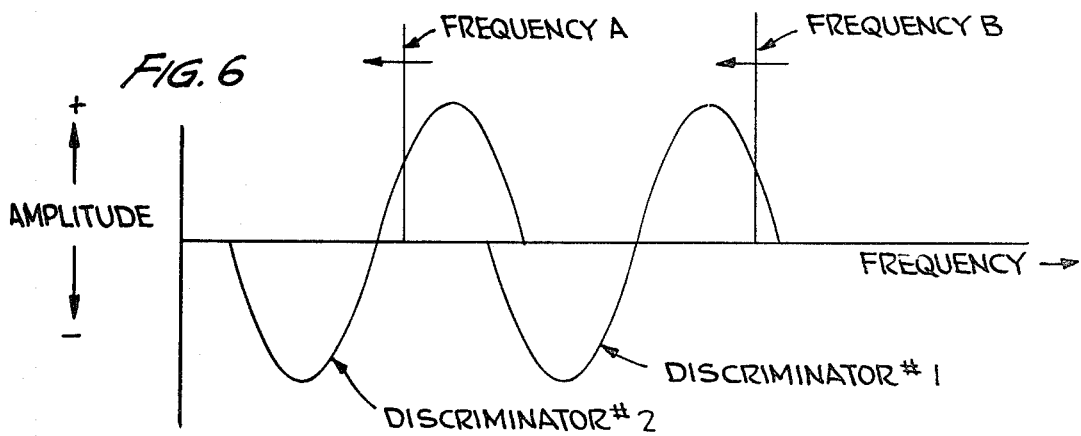
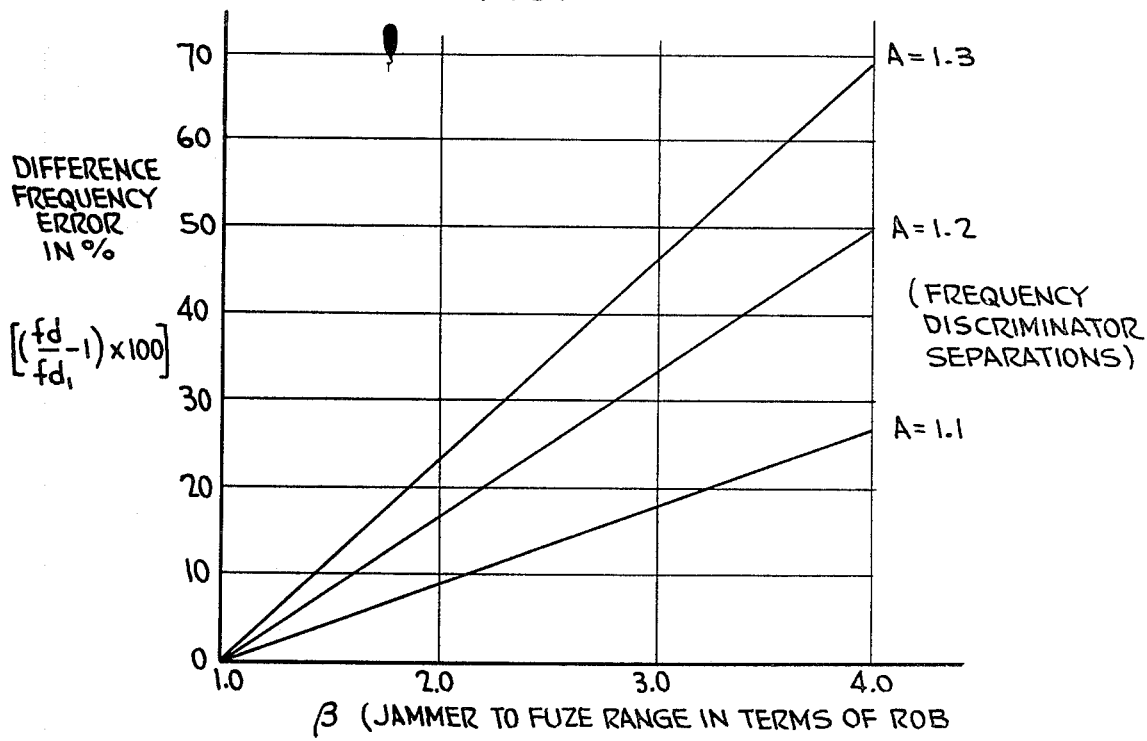

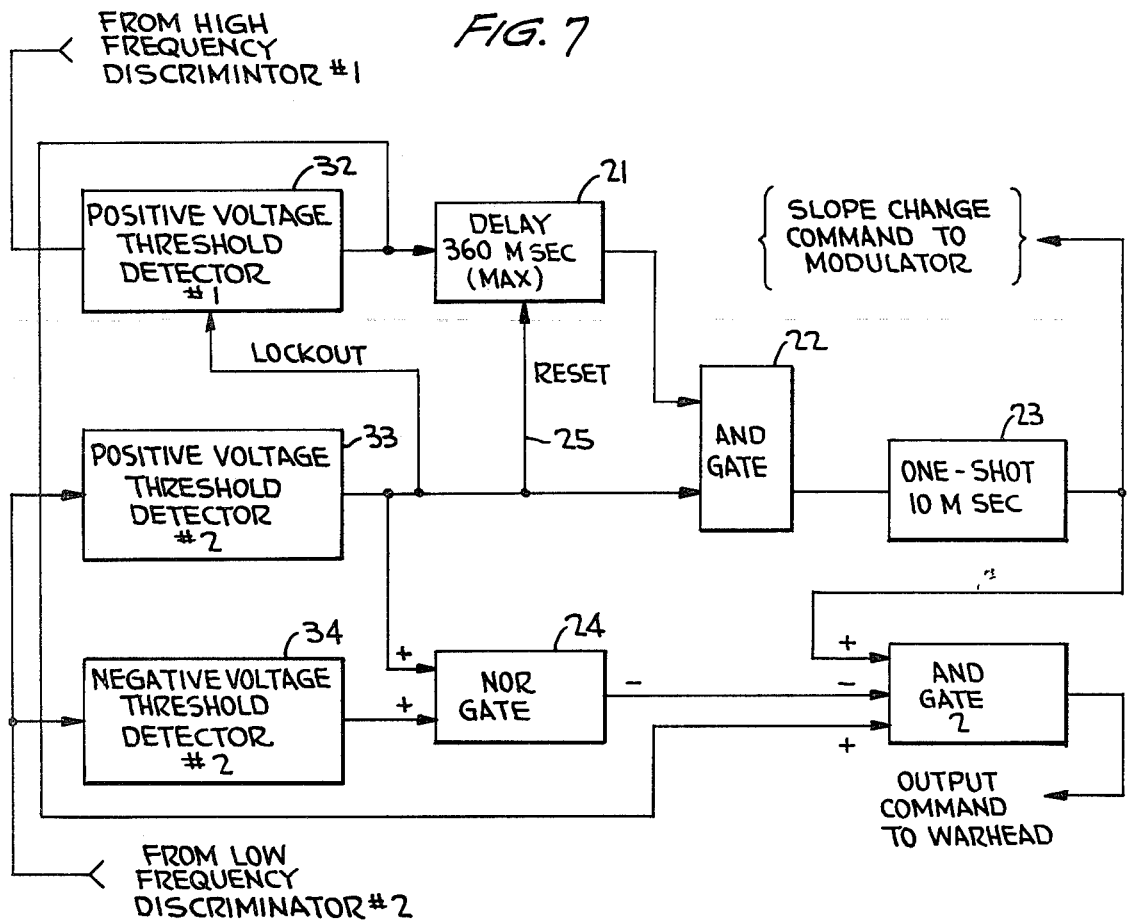
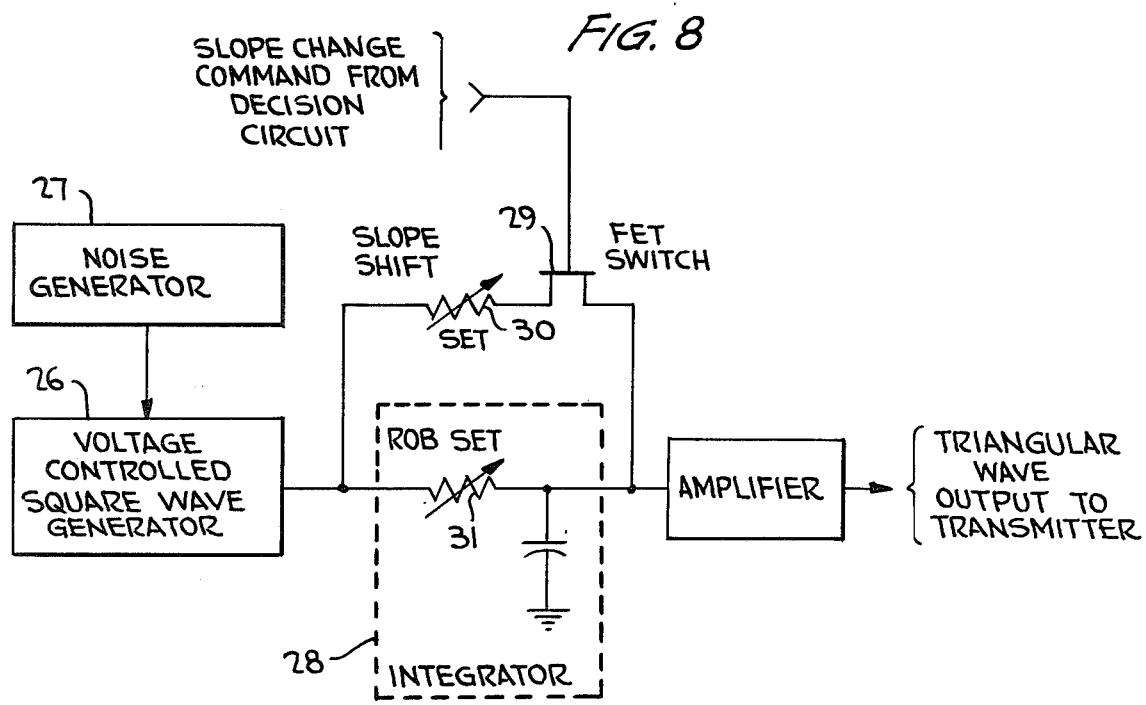

4,217,827

RADAR FUZING SYSTEM

This application is a continuation-in-part of Ser. No. 43,300 filed Apr. 23, 1970, now abandoned.

BACKGROUND OF THE INVENTION

This invention relates to radar target-to-fuze range sensing fuzes, and more particularly to a system for electronic counter-countermeasures (ECCM) for fuzes.

Radar range sensing fuzes operating in hostile environments are often subjected to a variety of electronic techniques often referred to as electronic countermeasures (ECM) which are intended to interfere with the proper operation of the fuzing system. From a radar fuzing standpoint ECM equipment can be classified in two general groups according to the intended purpose of the interference: (1) Dud Jammers designed to mask the intended signal by increasing the background clutter in the fuze receiver to desensitize the fuze to its own return signals (for example a high-powered CW transmitter modulated by noise), and (2) Early Jammers designed to generate deceptive signals that appear to the fuze as valid echoes from the intended target. The Early Jammer attempts to evoke premature or early fire commands in the fuze at ranges significantly beyond the desired warhead function range. An example might be a repeater jammer, which in addition to receiving, amplifying, and retransmitting a detected fuze signal, might impose additional intelligent modulation to the signal. Prior detailed knowledge of the electrical characteristic of the fuze is a primary tool employed by the Early Jammer designer or operator in the modulation effort.

This invention is an effective radar fuzing method which counters both types of Early Jammers, the out-of-spectrum early jammer, which exploits the AM detection characteristic of the fuze mixer, and the repeater early jammer that falsely produces an in-band signal spectrum simulating a valid target return signal.

It is therefore a primary object of this invention to provide a system for recognizing false signals produced by out-of-spectrum and repeater-type jammers.

Another object of the invention is to desensitize the fuze during the time the jammers are effective.

Yet another object of this invention is to actuate the fuze to fire when the fuze-to-jammer range reaches a predetermined range regardless of the presence of jamming signals.

SUMMARY OF THE INVENTION

A frequency modulated continuous wave radar signal is transmitted to a target and the signal reflected from the target is compared with a sample of the continuous wave transmitter to produce a difference frequency signal. The difference frequency signal is band-pass amplified, wide-band limited, and processed by two frequency discriminators displaced from each other in the frequency domain, but both within the frequency band of the limiter and band pass amplifier. Detectors, integrators, and thresholding circuits determine, with suitable false alarm rates, in which half of which discriminator the difference frequency signal is concentrated. As the radar fuze to target range decreases, the spectrum of the difference frequency signal progressively moves from the high frequency half of the half of the high frequency discriminator to the low frequency half of the low frequency discriminator. Detection of the difference frequency signal in the high frequency half of the high frequency discriminator initiates the fuze decision circuit. Subsequent detection in the high frequency side of the low frequency discriminator initiates an abrupt shift in the slope of the waveform modulating the transmitter. This slope change is adjusted so as to make the difference frequency signal resulting from a valid target abruptly shift back to the high frequency side of the high frequency discriminator. A decision circuit is synchronized to the shift in modulation. The decision circuit can, within narrow time limits, know when to expect the loss of detection in the low frequency discriminator and redetection of the signal in the high frequency discriminator. Difference frequency signals that are jammer-induced are recognized as invalid, since they do not respond or respond improperly to the shift in modulation.

BRIEF DESCRIPTION OF THE DRAWINGS

The specific nature of the invention as well as other objects, aspects, uses and advantages thereof will clearly appear from the following description and from the accompanying drawings in which:

FIG. 4 is a diagram of the frequency discriminators and positive and negative threshold voltage relationships.

FIG. 5 is a diagram of the fuze difference frequency error as a function of jammer-to-fuze range in accordance with an embodiment of the invention.

FIG. 6 is a diagram of frequency relationships between the frequency discriminators and jammer induced frequencies.

FIG. 7 is a block diagram of a decision circuit for use in an embodiment of the invention.

FIG. 8 is a block diagram of a modulator for use in an embodiment of the invention.

DESCRIPTION OF THE PREFERRED EMBODIMENTS

Figure 1:
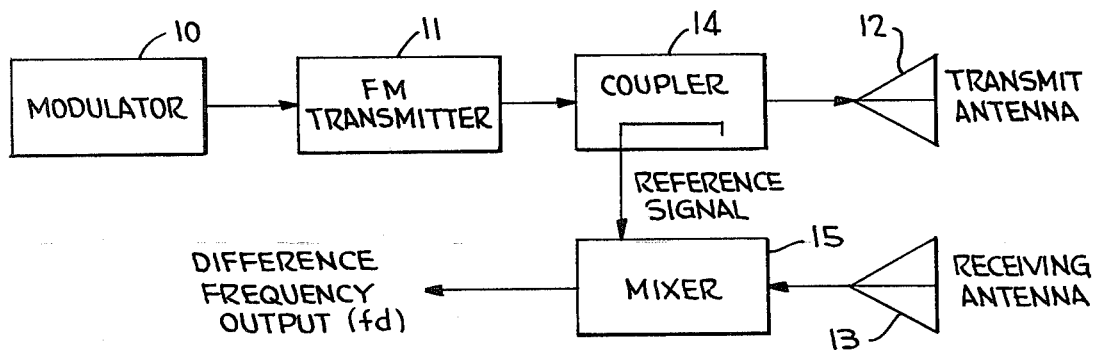
FIG. 1 is a block diagram of the frequency modulated (FM) continuous wave (CW) receiver for use in this invention.

A system for transmitting and receiving FM radar signals is illustrated by a block diagram of FIG. 1 which a modulator 10 applies suitable modulation to FM transmitter 11. Radar signals are directed at a target (not shown) by means of transmitting antenna 12 and the reflected signals are picked up by receiving antenna 13. A sample of the transmitted signal is derived from coupler 14 and is caused to "beat" with the reflected signal in mixer 15, thereby producing a difference frequency signal $f_d$.

Figure 2:
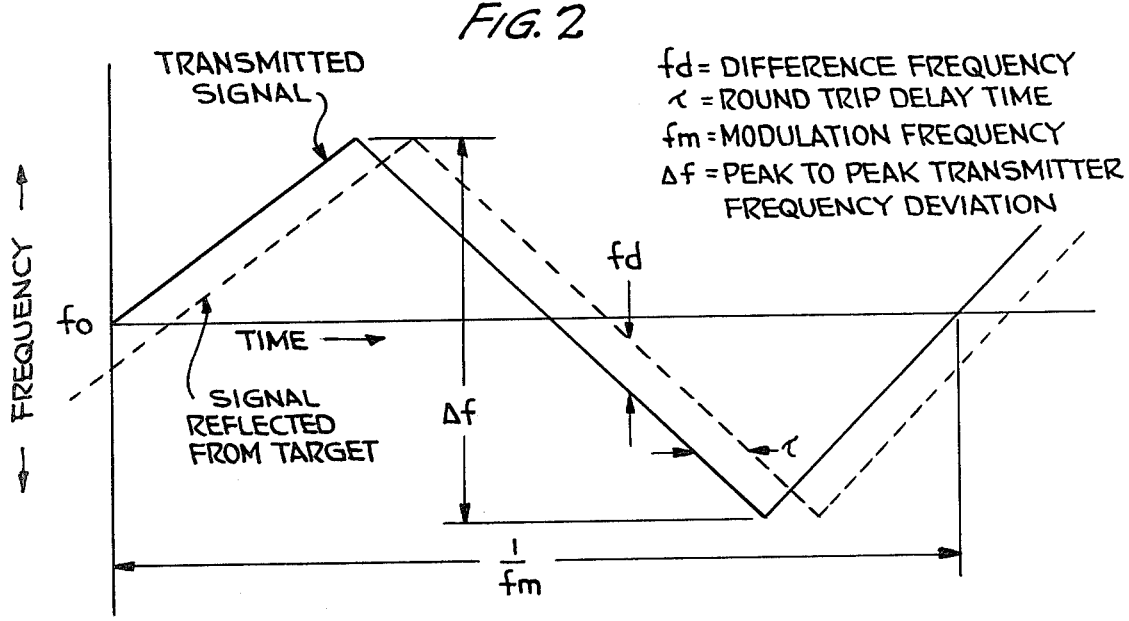
FIG. 2 is a diagram of the frequency-time relationship of transmitted and target reflected radar signals.

The frequency-time relationship of transmitted and reflected signals is illustrated in FIG. 2. When the transmission round-trip delay time ($\tau$) from the radar to the target and back is very much less than the modulation period (i.e. $\tau \gg 1/f_m$), the difference frequency $f_d$ (excluding effects of modulation turnaround and doppler terms) can be expressed by the conventional range equation $$f_d = 4Rf_m\Delta f/C \text{ where } R=\text{Range and } C=\text{velocity of light} \quad (1)$$

or simply $$f_d = \tau(df/dt)$$

where $$df/dt = 2\Delta f f_m$$

the linear rate of change of the transmitted frequency. Thus, a measurement of the difference frequency can result in a measure of the range R. This difference frequency can be processed in a variety of ways according to the intended purpose of the radar.

Figure 3:
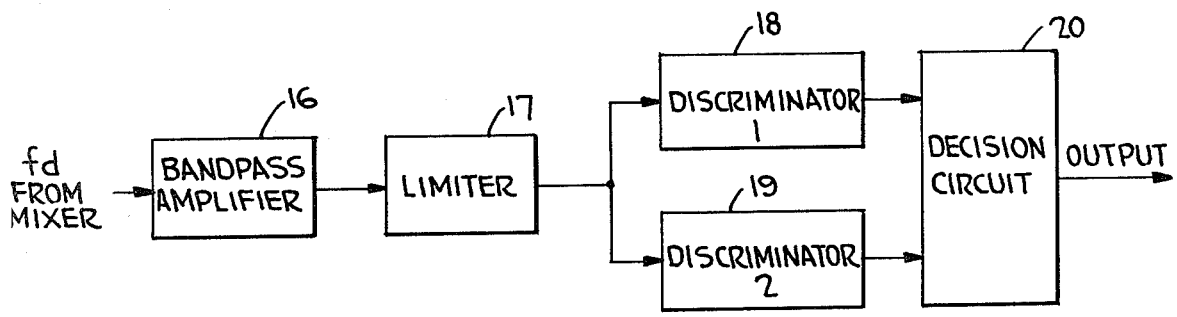
FIG. 3 is a block diagram of a system for processing a difference frequency in one embodiment of the invention.

One system for processing the difference frequency signal is illustrated in FIG. 3, in which signal and or noise out of the mixer are amplified in bandbass amplifier 16 and limited to a constant peak to peak output by limiter 17.

When the mixer output frequency spectrum is of uniform density across the bandwidth of the amplifier, the smoothed output of discriminators 18 and 19 is near zero.

If the mixer output frequency spectrum is not of uniform density across the bandwidth of the amplifier (i.e., a preponderance of a difference frequency signal $f_d$ or a narrow band of frequencies around $f_d$) the smoothed discriminator outputs could be offset from zero. For example, if $f_d$ is centered in the high frequency half of the high frequency discriminator (#1) a positive output voltage will be present at the smoothed output of that discriminator. This output voltage is sensed in the decision circuit 20 by a positive voltage threshold detector (reference FIG. 4). If the voltage threshold is exceeded, the decision circuit is initiated. As the fuze to target round trip delay time $\tau$ (reference FIG. 2) decreases, i.e., fuze-to-target range decreases, the difference frequency signal $f_d$ will move progressively lower in frequency. When $f_d$ lowers in frequency to the high frequency side of the low frequency discriminator (#2), the low frequency discriminators' smoothed-output voltage will go positive. A second positive voltage threshold detector in the decision circuit (20) FIG. 3 senses this low frequency discriminator output voltage. When this second positive voltage threshold is exceeded, the decision circuit produces an output to the warhead provided this second threshold was exceeded after the first voltage threshold in a time period that was consistent with expected rates of fuze closure toward the target. (It should be noted that for some applications, a single discriminator with both positive and negative voltage thresholds can be used in lieu of two discriminators. Experience and analysis has shown, however, the choice of two discriminators is superior for most extended targets such as the earth's surface.) Up until now, it has been assumed that the difference frequency signal $f_d$ was a valid return from a target.

However, a difference frequency signal sweeping from high to low frequency and thus falsely simulating the desired target can be generated by a jammer capable of coupling radio frequency (rf) power levels of typically about −25 dBm into the fuze mixer. If the jammer rf is, for example, amplitude modulated, fuze mixer output products will contain these modulation frequencies. Assuming sufficient amplitude and proper jammer modulation characteristics, these mixer products can be amplified by the fuze band-pass amplifier and be processed by the fuze as valid returns. The unprotected fuze is typically most sensitive to jammer-produced radio-frequencies just outside the fuze transmitted spectrum—hence the expression out-of-spectrum jammer. Provided the jammer can couple the required energy to the fuze antenna, the jammer operator need only sweep the jammer modulation in the direction and within the acceptable rate of the fuze decision circuit to evoke a premature fuze function. This invention precludes the possibility of the above-described jamming by modifying the modulation in the fuze to include an induced modulation slope change. The detection process is extended so that after the positive voltage threshold detector for the low frequency discriminator is exceeded, the modulation slope is abruptly changed. The change is proper to cause a valid target difference frequency signal to move abruptly from the high frequency half of the low frequency discriminator, back to the high frequency half of the high frequency discriminator. The fuze decision circuit is synchronized with this slope change to detect the expected sequence and duration of changes in threshold detector outputs resulting from a valid target return signal.

In normal operation, the round trip delay ($\tau$) would decrease to a value $\tau_2$ as the fuze approached the fuse range of burst (ROB). At the range corresponding to $\tau_2$, $f_{d2} = \tau_2(df/dt)$ which would be a frequency well within the high frequency half of the low frequency discriminator (#2).

When the positive voltage threshold detector for discriminator #2 produces an output, the modulation slope is abruptly changed from df/dt to A(df/dt) where A > 1 so that the difference frequency abruptly becomes $$f_{d1} = \tau_2 A(df/dt)$$

where $f_{d1}$ would be a frequency well within the positive half of discriminator #1. A, therefore, has the value $f_{d1}/f_{d2}$ where $f_{d1}-f_{d2}$ is the frequency separation between the two discriminators. After the modulation slope change, the positive voltage threshold detector for discriminator #1 would, in one integration time period (typically 2 to 10 milliseconds) produce its second output of the total decision sequence. Also, in one integration period after the modulation slope change, the positive voltage threshold detector for discriminator #2 would terminate its output since the difference frequency signal was abruptly shifted out of discriminator #2. The decision circuit recognizes the described sequences and timings of the outputs from the threshold detectors as having been produced by a valid return signal.

As previously discussed, it is possible for an out-of-spectrum jammer to produce apparent fuze difference frequencies that can traverse through the discriminators at a rate and direction that initially appear valid. The jammer modulation would not be synchronized, however, with the change of fuze modulation slope. Thus premature functioning is in this way prevented. Immediately after the modulation shift, the falsely produced difference frequency signal would still be in the high frequency side of discriminator #2 and continuing its traverse to an even lower frequency. The decision circuit, being synchronized with the fuze modulation change, would, however, expect the difference frequency signal to jump back to the high frequency side of the #1 discriminator and, in approximately one integration period, to produce an output from the positive voltage threshold of discriminator #1. The decision circuit simultaneously expects the output from the positive voltage threshold detector for #2 discriminator to extinguish. Since the falsely produced difference frequency would not produce the proper thresholding sequences, the decision circuit would recognize the difference frequency signal as being invalid. Having recognized the signals as invalid, the fuze can be programmed to dud on jamming or, if preferred, return to the normal fuze modulation and decision criteria after a short delay. In the latter case, it is possible, that prior to the ROB, the jammer-to-valid-signal ratio will decrease to a level that is tolerable to the fuze. The valid fuze return signal would then evoke the proper sequence in the decision circuit allowing the proper warhead commands to be given. If, however, the jammer modulation components stay in the fuze difference frequency amplifier bandwidth with sufficient signal strength to overpower the valid fuze return signal, the jammer would effectively dud the fuze. This invention could therefore transform this potential premature jammer signal into a dud signal or, if sufficient valid signal level is obtained at burst range, override the jammer for a proper fuze function. As previously stated, this technique can also be effective against a repeater premature jammer, i.e., one capable of receiving, modulating, amplifying, and retransmitting the fuze transmitted rf. The jamming operation can be described by assuming that the repeater jammer is located at a range from the fuze represented by a transmission delay time of $\beta\tau_2$ where $\beta>1$. This jammer can be potentially effective with low transmitted power by, receiving the fuze transmissions, serrodyning and retransmitting back to the fuze the serrodyned signal. (Serrodyning produces a frequency translation of the fuze transmitted signal, the amount of translation being determined by the jammer modulation.) This translated frequency can readily be swept by the jammer. The result in the fuze can therefore be a traversing difference frequency signal ($f_d$) in the fuze difference frequency bandwidth. This difference frequency can be traversed through the fuze discriminators in a time frame initially acceptable to the decision circuit and would evoke a premature firing in a fuze not incorporating an effective counter countermeasure. Premature functioning due to the repeater jammer is also prevented by the abrupt modulation change and decision logic. The fuze modulation slope is, as previously explained, changed if the positive voltage threshold detector for discriminator #2 produces on output within a prescribed time frame after the positive voltage threshold detector for discriminator #1 produces an output. Just before this modulation slope change the difference frequency can be represented:

$$f_d = f_{d2} = \beta\tau_2(df/dt) - \Delta f_j \quad (5)$$

where $f_{d2}$ lies within the high frequency side of discriminator #2.
Since $$\tau_2(df/dt) = f_{d2}$$

$$\Delta f_j = f_{d2}(\beta - 1) \quad (6)$$

where $\Delta f_j$ is the frequency translation required by the jammer. When the positive threshold voltage for discriminator #2 is exceeded by $f_{d2}$, the fuze modulation slope is abruptly changed to $A(df/dt)$. The difference signal is then represented by $$f_d = \beta\tau_2 A (df/dt) - \Delta f_j \quad (7)$$
$$= \beta f_{d1} - \Delta f_j$$

since $$f_j = f_{d2}(\beta - 1)$$

$$f_d = \beta f_{d1} - f_{d2}(\beta - 1)$$

and since $$f_{d2} = f_{d1}/A \text{(by definition of A)}$$

$$f_d = \beta f_{d1} = \frac{f_{d1}}{A}(\beta - 1) \quad (8)$$

$$f_d = f_{d1}\left[\beta - \frac{\beta}{A} + \frac{1}{A}\right]$$

Since $A>1$ and $\beta>1$, $f_d \neq f_{d1}$. The decision circuit, being in synchronization with the modulator, expects $f_d$ to become equal to $f_{d1}$ a value that lies within the high frequency side of discriminator #1 which would in one integration period, produce an output from the positive voltage threshold detector for discriminator #1. However since $f_d \neq f_{d1}$ the resulting inconsistency can, as in the case of the out-of-spectrum jammer, be detected by the decision circuit and thus no false warhead firing command would be initiated. If desired, after a short delay, the fuze could return to the normal modulation slope and the process repeated with the possibility that at ROB the valid return could exceed the jammer signal, or depending upon the fuze to jammer geometry, $\beta$ approached unity. As seen by the above equations, if $\beta$ approaches unity, representing a jammer-to-fuze slant range approaching the fuze ROB; the fuze would fire the warhead on the jammer signal. A plot of the above derived equation (8), expressed in percentage of error, is shown in FIG. 5 for three different separations between the two frequency discriminators (i.e., $A=1.1$, 1.2 and 1.3). Assume a fuze is implemented with $f_{d2}/f_{d1} = 1.2$ or $A=1.2$. Under this condition when the fuze-to-jammer range is 1.5 times the desired function height, the fuze difference frequency signal ($f_d$) due to the jammer after the slope shift is approximately 8 percent greater than $f_{d1}$. Practical discriminator widths and tolerances could enable a detection of this 8 percent error and therefore delay a fire signal unit $\beta$ more closely approaches unity.

Consideration is given to the effect of multiple spectral lines in the difference frequency signal band purposely produced by the out-of-spectrum jammer. These multiple lines could be "walked" by the jammer through the discriminators.

One may assume the frequencies of two jammer-produced spectral lines could be as shown in FIG. 6 just before the modulation slope change command is given by the fuze decision circuit. In this case, since the jammer-produced frequencies are moving toward the left of the FIG. (i.e., to a lower frequency), frequency A could move out of the high frequency side of discriminator #2 and extinguish its thereshold detector very soon after the slope change command is given. Also, it is conceivable that in the same time period frequency B could have set up a positive threshold voltage from discriminator #1. It is therefore conceivable that these threshold changes could occur in a manner that would appear as valid to the decision circuit and therefore the jammer-produced signals would be erroneously considered valid. This potential problem is circumvented by providing a negative voltage threshold detector 34 for discriminator #2. Since a valid signal should never appear in the low frequency side of discriminator #2, detection of such signal can be used to inhibit the warhead fire command. The inclusion of the circuitry for this purpose is considered desirable if it is assumed the jammer operator has sufficient information about the fuze processing circuitry. In one imbodiment of the invention the decision circuit functioned as follows: Referring to FIG. 7, when the positive voltage threshold detector 32 for discriminator #1 is first exceeded, a 360-ms delay (one-shot) 21 starts. As the fuze continues its closure toward the target, the difference frequency signal in the amplifier 16 (FIG. 3) moves through discriminator #1 toward discriminator #2. If in FIG. 7 the positive voltage threshold detector 33 for discriminator #2 produces an output in the 360 ms (a velocity time gate period established by the slowest expected rate of fuze closure toward the target), AND gate 22 is set up. This, in turn, starts the 10-ms one-shot 23, which provides an input to AND gate 2 and serves as a command for the modulator to change modulation slope. This change of modulation slope, under valid signal conditions, shifts the difference frequency signal back to the high frequency side of discriminator #1. Positive voltage 33 and negative voltage threshold detectors 34 for discriminator #2 are applied to NOR gate 24 to inhibit AND gate 2. Therefore, if during the 10-ms period the normal condition exists (i.e. an output from positive voltage threshold detector for discriminator #1 and the other two thresholds are not exceeded), all three inputs to AND gate 2 will be positive, and a warhead fire command will be given. If, however, the normal conditions are not generated in the decision logic circuit within the 10 ms period of one-shot 23, the received signal is assumed false and the modulation slope is returned to normal. In order that signal processing can resume immediately after the 10 ms a reset 25 is included in the circuitry to turn off the 360 ms one-shot 21 at the same time the 10-ms one-shot 23 is started. A lock out is provided to prevent initiation of the decision process by the positive voltage threshold detector #1 (32) if its output occures after an output from the positive voltage threshold detector #2 (33). This abnormal sequence could not be induced by valid signal returns.

A modulator for use in this invention takes the form of the block diagram shown in FIG. 8. The repetition rate of the square wave generator 26 is randomly varied around an average value by noise generator 27. The integration of the square wave in integrator 28 produces a modulating triangle wave with the proper slope for the prescribed fuze range-of-burst (ROB). A field-effect transistor switch 29 connects a resistor 30 across the ROB set resistor 31. Upon command from the decision circuit (i.e., the 10-ms one-shot 23 output of FIG. 7), transistor switch 29 closes, placing the slope shift resistor 30 in parallel with the ROB set resistor 31 which increases the slope of the triangle wave for the desired difference frequency spectrum shift.

It will be appreciated that the invention disclosed provides an effective ECCM system against two classes of interference, the out-of-spectrum jammer and the repeater jammer. In general, it would be advantageous to continually recycle the fuze modulation sequence after the decision circuit has recognized a potentially effective jammer attempt. This would permit the fuze to fire on the repeater jammer if the fuze-to-jammer encounter geometry permitted a fuze-to-jammer range approaching the desired fuze function height (i.e., the jammer located near the target). Because of the anisotropic fuze and jammer irradiation, and the diverse fuze-to-jammer encounter geometry, the possibility always exists that either class of jammer will briefly fail to overpower the fuze receiver. In this case, recycling could permit the fuze to function properly on the valid signal.

If it is assumed that the jammer operator did not have specific and complete knowledge of the invention, or that if these details were known, the jammer equipment lacked the sophistication to cope with the fuze decisioning process, the invention can offer excellent fuze operational ECCM enhancement at a relatively small cost in fuze complexity.

There is the possibility that by means of his intelligence efforts the jammer operators and designers might obtain the detailed technical knowledge of the fuze. Therefore consideration has been given to determine what, if any, fuze premature methods are open to jammers with this knowledge. From this consideration it appears that to successfully use the information either class of jammer must have the ability to receive and process the fuze transmissions while simultaneously transmitting on essentially the same frequency. The difficulty of dealing with the crosstalk between the jammer transmitter and the jammer receiver can become especially severe in the case of the out-of-spectrum jammer that must transmit considerably more power than the repeater jammer to be equally effective. Also both classes of jammers must, in approximately one fuze integration period (a few milliseconds typically), be capable of measuring the slope of the fuze modulation, detecting a relatively small change in the slope, and properly altering the jammer modulation. The jammers must couple the above capabilities with the detailed knowledge of the fuze parameters in a programmer designed to shift the jammer modulation the correct amount at the correct time. The magnitude of modulation shift required by the out-of-spectrum jammer is fixed by the fuze design. However, the shift required by the repeater jammer is dependent upon the fuze-to-jammer range at the time of the fuze modulation shift. The determination of range would probably require the addition of a skin tracking radar near the jammer sight with appropriate interconnection to the jammer programmer.

It should be understood that I do not desire to be limited to the exact details of construction shown and described, for obvious modifications will occur to a person skilled in the art.

I claim:
1. A radar fuzing system for distinguishing valid return signals from jamming signals, comprising:
 (a) means for transmitting a radar signal to a target;
 (b) means for receiving a return signal from said target;
 (c) means for deriving a difference frequency signal from said transmitted and reflected signals;
 (d) means for shifting the frequency spectrum of said difference frequency signal; and
 (e) means responsive to a shift of said difference frequency signal for preventing premature firing of said fuzing system and for firing said fuzing system in response to a valid return signal.

2. The system of claim 1 wherein said means for shifting the frequency band-width comprises means for modifying the modulation slope of said transmitted signal.

3. The system of claim 2 wherein said means for modifying the modulation slope comprises means for altering impedance in the modulator circuit of said radar signal transmitting means.

* * * * *